United States Patent
Yeo et al.

(10) Patent No.: US 10,332,457 B2
(45) Date of Patent: Jun. 25, 2019

(54) DISPLAY APPARATUS AND METHOD OF DRIVING THE SAME

(71) Applicant: Samsung Display Co., LTD., Yongin-si, Gyeonggi-Do (KR)

(72) Inventors: Dongmin Yeo, Asan-si (KR); Junghyun Kim, Seoul (KR); Hee-kwang Song, Suwon-si (KR); Seokhyun Nam, Seoul (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 37 days.

(21) Appl. No.: 14/981,182

(22) Filed: Dec. 28, 2015

(65) Prior Publication Data
US 2016/0260391 A1  Sep. 8, 2016

(30) Foreign Application Priority Data

Mar. 6, 2015 (KR) .................. 10-2015-0031870

(51) Int. Cl.
*G09G 3/34* (2006.01)
*G02F 1/1335* (2006.01)

(52) U.S. Cl.
CPC ......... *G09G 3/3413* (2013.01); *G09G 3/3426* (2013.01); *G02F 2001/133624* (2013.01); *G09G 2320/0242* (2013.01); *G09G 2320/043* (2013.01); *G09G 2320/0666* (2013.01)

(58) Field of Classification Search
None
See application file for complete search history.

(56) References Cited

U.S. PATENT DOCUMENTS

| 7,782,283 | B2 * | 8/2010 | Hong | G09G 3/3413 |
| | | | | 345/102 |
| 8,177,389 | B1 * | 5/2012 | Kropf | G01J 1/32 |
| | | | | 362/231 |
| 8,629,831 | B2 | 1/2014 | Park et al. | |
| 9,311,893 | B2 * | 4/2016 | Kwon | G09G 3/3426 |

(Continued)

FOREIGN PATENT DOCUMENTS

| EP | 2163594 A2 | 3/2010 |
| EP | 2442180 A1 | 4/2012 |

(Continued)

OTHER PUBLICATIONS

Extended European Search Report for Application No. 16157166.3-1903 dated Aug. 24, 2016.

*Primary Examiner* — William Boddie
*Assistant Examiner* — Bipin Gyawali
(74) *Attorney, Agent, or Firm* — Cantor Colburn LLP

(57) ABSTRACT

A display apparatus includes a backlight unit including a first light source emitting a first light having at least two peak wavelengths and a second light source emitting a second light having a peak wavelength different from the two peak wavelengths, and a display panel receiving the first and second lights to display an image corresponding to an input image data, and a light source driver which analyzes a color information of predetermined dimming areas on the basis of the input image data and controls a contribution of the first and second light sources with respect to a target brightness of each of the predetermined dimming areas in accordance of the color information.

12 Claims, 11 Drawing Sheets

(56) References Cited

U.S. PATENT DOCUMENTS

| | | | |
|---|---|---|---|
| 9,852,700 B2 * | 12/2017 | Ahn | G09G 3/3426 |
| 2006/0066266 A1 * | 3/2006 | Li Lim | G02F 1/133603 |
| | | | 315/291 |
| 2007/0152926 A1 * | 7/2007 | Kwon | G09G 3/3426 |
| | | | 345/82 |
| 2007/0152953 A1 * | 7/2007 | Hong | G09G 3/3413 |
| | | | 345/102 |
| 2009/0021469 A1 * | 1/2009 | Yeo | G02F 1/133603 |
| | | | 345/102 |
| 2010/0171690 A1 | 7/2010 | Park et al. | |
| 2011/0032283 A1 * | 2/2011 | Baek, II | G09G 3/3413 |
| | | | 345/690 |
| 2012/0001964 A1 | 1/2012 | Masuda et al. | |
| 2012/0287148 A1 | 11/2012 | Brown | |
| 2013/0026948 A1 * | 1/2013 | Kim | C09K 11/592 |
| | | | 315/294 |
| 2016/0049122 A1 * | 2/2016 | Yoon | G09G 3/3607 |
| | | | 345/690 |
| 2016/0062023 A1 * | 3/2016 | Itoh | G02B 6/0068 |
| | | | 362/608 |

FOREIGN PATENT DOCUMENTS

| | | |
|---|---|---|
| KR | 101320018 B1 | 10/2013 |
| KR | 1020140002475 A | 1/2014 |
| KR | 1020140033776 A | 3/2014 |
| KR | 101512050 B1 | 4/2015 |
| WO | 2010085505 A1 | 7/2010 |

\* cited by examiner

DISPLAY APPARATUS AND METHOD OF DRIVING THE SAME

This application claims priority to Korean Patent Application No. 10-2015-0031870, filed on Mar. 6, 2015, and all the benefits accruing therefrom under 35 U.S.C. § 119, the content of which in its entirety is herein incorporated by reference.

BACKGROUND

1. Field

The invention relates to a display apparatus and a method of driving the same. More particularly, the invention relates to a display apparatus having a backlight unit capable of expanding a color reproduction range and a method of driving the display apparatus.

2. Description of the Related Art

In general, a liquid crystal display ("LCD") includes an LCD panel displaying an image by controlling a transmittance of light passing through a liquid crystal layer and a backlight unit disposed under the LCD panel to provide the LCD panel with the light.

In recent years, a dimming technology that decreases an amount of the light generated by the backlight unit and increases an amount of the light passing through pixels of the LCD panel in accordance with images is applied to the LCD. The dimming technology divides the backlight unit into a plurality of blocks and emits the light at different brightness in accordance with the blocks, respectively. In a three-dimensional dimming technology, driving red, green, and blue light emitting diodes in accordance with brightness and colors has been developed.

SUMMARY

When a liquid crystal display ("LCD") employs the red, green, and blue light emitting diodes and performs dimming technology on red, green, and blue light emitting diodes in accordance with the color, a manufacturing cost of the LCD increases and a difference in color characteristic between the red, green, and blue light emitting diodes occurs. As a result, a color balance in images is difficult to be maintained. In addition, a display device satisfying the ultra-high-definition ("UHD") TV standard is required.

The invention provides a display apparatus having a backlight unit capable of expanding a color reproduction range.

The invention provides a method of driving the display apparatus.

Embodiments of the invention provide a display apparatus including a backlight unit including a first light source emitting a first light having at least two peak wavelengths and a second light source emitting a second light having a peak wavelength different from the two peak wavelengths, a display panel receiving the first and second lights to display an image corresponding to an input image data, and a light source driver analyzing a color information of predetermined dimming areas on the basis of the input image data and controlling a contribution of the first and second light sources with respect to a target brightness of each of the predetermined dimming areas in accordance of the color information.

Embodiments of the invention provide a display apparatus including a backlight unit including a first light source emitting a white light and a second light source emitting a first color light, a display panel receiving the white light and the first color light to display an image corresponding to an input image data, and a light source driver analyzing a color information of predetermined dimming areas on the basis of the input image data and controlling a contribution of the first and second light sources with respect to a target brightness of each of the predetermined dimming areas in accordance of the color information.

Embodiments of the invention provide a method of driving a display apparatus, including analyzing a color information of dimming areas on the basis of an input image data, extracting a color dimming area to be color-dimmed in accordance with the analyzed result, setting a target brightness of each of the dimming areas when the color dimming area does not exist in accordance with the extracting result to perform a brightness dimming on the dimming areas, controlling a contribution of a first light source emitting a white light and a second light source emitting a color light when the color dimming area exists in accordance with the extracting result to perform a color dimming on the color dimming area, and setting a target brightness of remaining dimming areas of the dimming areas except for the color dimming area when the color dimming area exists in accordance with the extracting result to perform the brightness dimming on the remaining dimming areas.

According to the above, the color dimming may be performed on a desired color, and thus a manufacturing cost of the display apparatus may be reduced and a color reproduction range may be expanded.

In addition, when the display apparatus employs two light sources and the two light sources include the same light emitting diode chip, a difference in color characteristics between the two light sources may be prevented from occurring even though a time lapses.

BRIEF DESCRIPTION OF THE DRAWINGS

The above and other advantages of the invention will become readily apparent by reference to the following detailed description when considered in conjunction with the accompanying drawings, in which.

DETAILED DESCRIPTION

Figure 1:
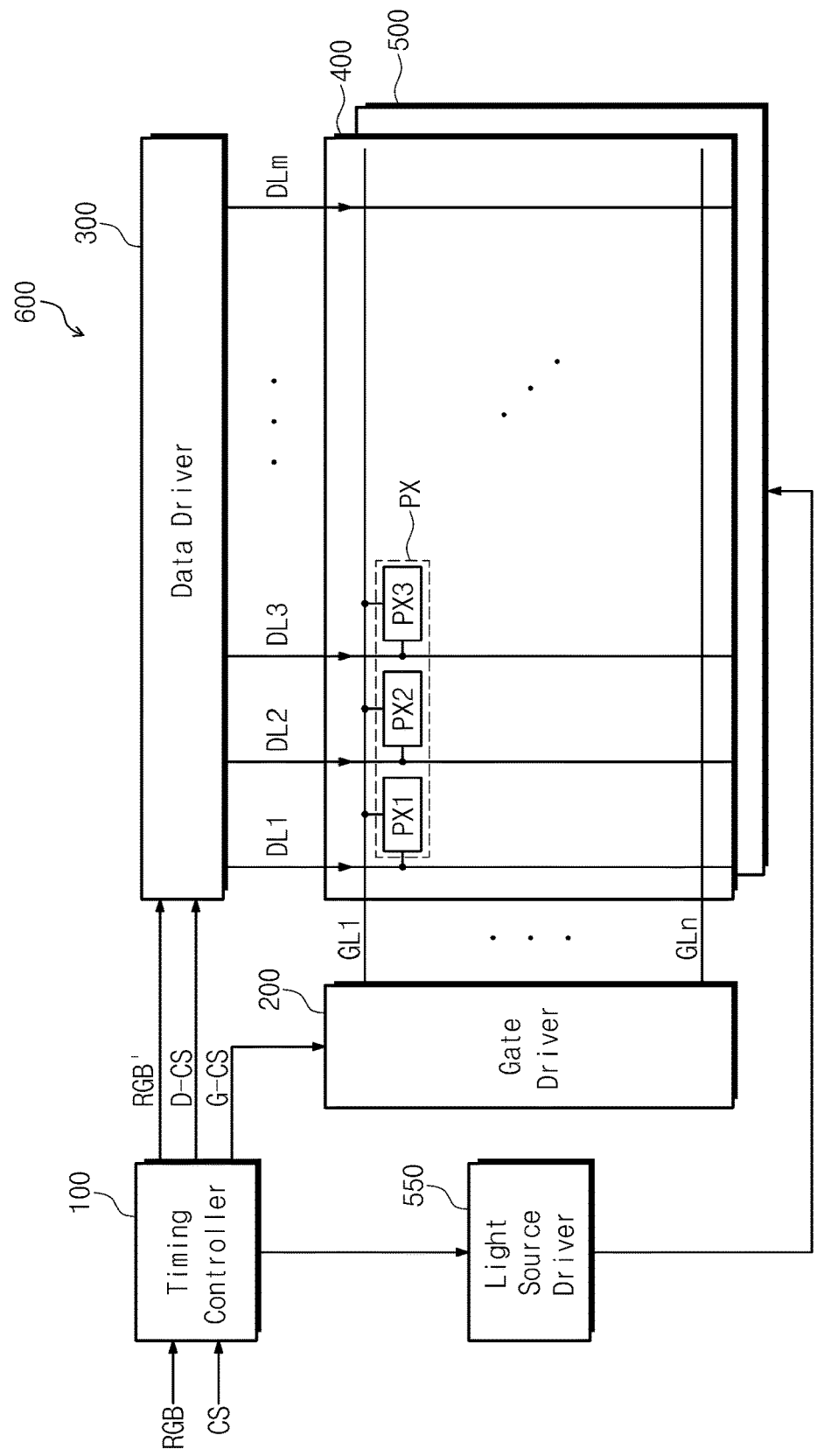
FIG. 1 is a block diagram showing an exemplary embodiment of a display apparatus according to the invention.

The following description with reference to the accompanying drawings is provided to assist in a comprehensive understanding of various embodiments of the invention as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the invention is provided for illustration purpose only and not for the purpose of limiting the invention as defined by the appended claims and their equivalents.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

It is to be understood that the singular forms "a," "an," and "the" include plural referents unless the context clearly dictates otherwise. Thus, for example, reference to "a component surface" includes reference to one or more of such surfaces.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

FIG. 1 is a block diagram showing a display apparatus 600 according to an exemplary embodiment of the invention.

Referring to FIG. 1, the display apparatus 600 includes a display panel 400 displaying an image, a panel driver which drives the display panel 400, a backlight unit 500 providing a light to the display panel 400, and a light source driver 550 driving the backlight unit 500. The panel driver includes a gate driver 200, a data driver 300, and a timing controller 100 controlling a driving of the gate driver 200 and the data driver 300.

The display panel 400 includes a plurality of gate lines GL1 to GLn, a plurality of data lines DL1 to DLm, and a plurality of pixels PX. The gate lines GL1 to GLn extend in a row direction and are arranged in a column direction to be substantially parallel to each other. The data lines DL1 to DLm extend in the column direction and are arranged in the row direction to be substantially parallel to each other.

Each of the pixels PX includes first, second, and third sub-pixels PX1, PX2, and PX3 each including a thin film transistor (not shown) and a liquid crystal capacitor (not shown). In an exemplary embodiment, the first, second, and third sub-pixels PX1, PX2, and PX3 respectively display red, green, and blue colors, for example. In FIG. 1, each pixel PX includes three sub-pixels, but the number of the sub-pixels should not be limited to three. That is, each pixel PX may include two, or four, or more sub-pixels. In addition, the colors displayed by the first, second, and third sub-pixels PX1, PX2, and PX3 should not be limited to the red, green, and blue colors. That is the first, second, and third sub-pixels PX1, PX2, and PX3 may display various other colors.

The timing controller 100 receives RGB image signals RGB and control signals CS from the outside of the display apparatus 600. The timing controller 100 converts the RGB image signals RGB in consideration of interface between the data driver 300 and the timing controller 100 and applies the converted RGB signal RGB' to the data driver 300. The timing controller 100 generates a data control signal D-CS, e.g., an output start signal, a horizontal start signal, etc., and a gate control signal G-CS, e.g., a vertical start signal, a vertical clock signal, a vertical clock bar signal, etc., on the basis of the control signals CS. The data control signal D-CS is applied to the data driver 300 and the gate control signal G-CS is applied to the gate driver 200.

The gate driver 200 sequentially outputs gate signals in response to the gate control signal G-CS provided from the timing controller 100. Accordingly, the pixels PX are sequentially scanned by the gate signals in the unit of row.

The data driver 300 converts the RGB image signals RGB' to data voltages in response to the data control signal D-CS provided from the timing controller 100. The data voltages are applied to the display panel 400.

Therefore, each pixel PX is turned on by a corresponding gate signal of the gate signals, and the turned-on pixel PX receives a corresponding data voltage from the data driver 300 to display the image having a desired grayscale.

As shown in FIG. 1, the backlight unit 500 is disposed at a rear side of the display panel 400 and provides the light to the display panel 400. In an exemplary embodiment, the backlight unit 500 includes a first light source emitting a first light having at least two peak wavelengths and a second light source emitting a second light having a peak wavelength different from the two peak wavelengths, for example.

The backlight unit 500 will be further described in detail with reference to FIGS. 3 and 5.

Figure 2:
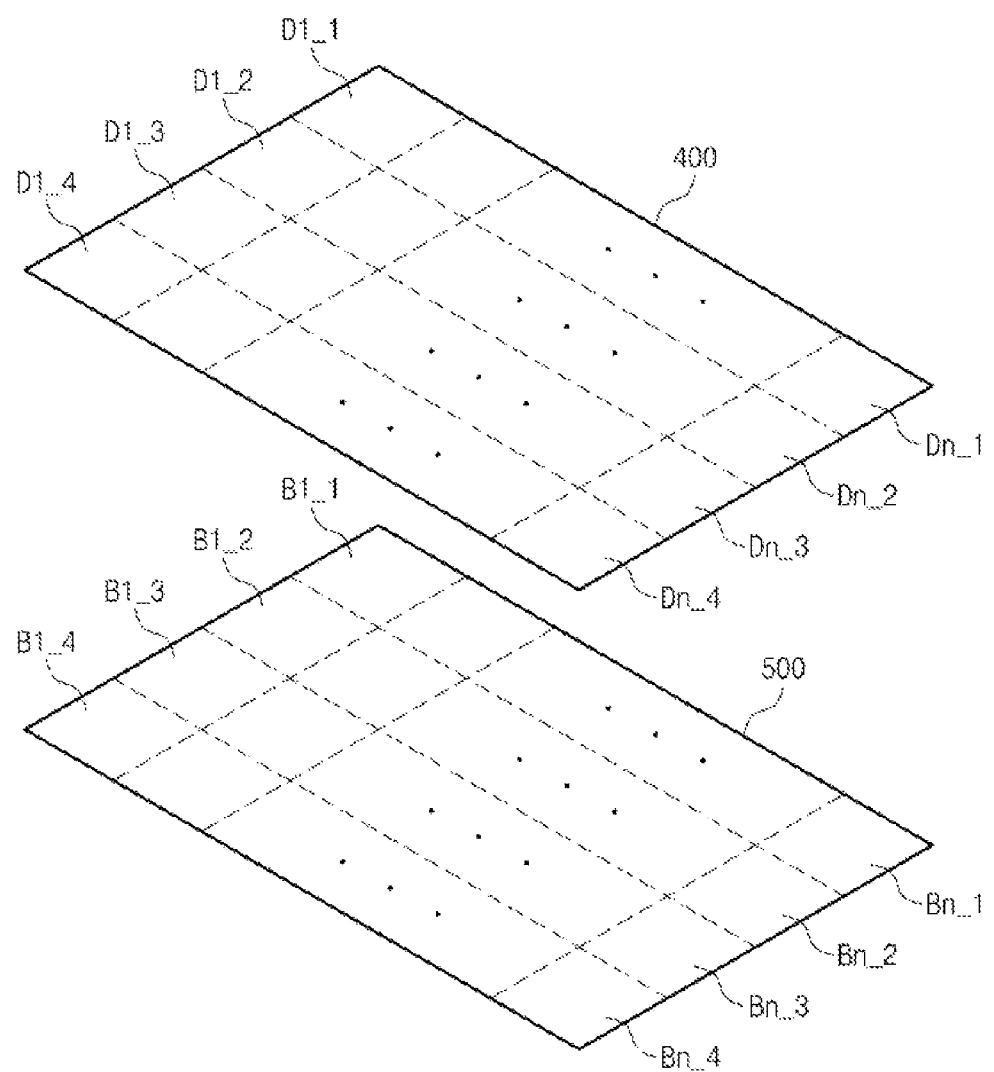
FIG. 2 is a cross-sectional view showing the display apparatus shown in FIG. 1.

FIG. 2 is a cross-sectional view showing the display apparatus 600 shown in FIG. 1.

Referring to FIG. 2, the display panel 400 includes a plurality of dimming areas D1_1 to Dn-4. The display panel 400 has a two-dimensional dimming structure in which the dimming areas D1_1 to Dn_4 arranged in two different directions. In an exemplary embodiment, the dimming areas D1_1 to Dn_4 are defined in the display panel 400 in four rows by n columns, for example. For the convenience of explanation, FIG. 2 shows the dimming areas D1_1 to Dn_4 arranged in four rows, but they should not be limited thereto or thereby. That is, the dimming areas may be arranged in a different number of rows.

The backlight unit 500 includes a plurality of light source blocks B1_1 to Bn_4 arranged to correspond to the dimming areas D1_1 to Dn_4 in a one-to-one correspondence. Each of the light source blocks B1_1 to Bn_4 provides a corresponding dimming area of the dimming areas with a first light and a second light.

Figure 3:
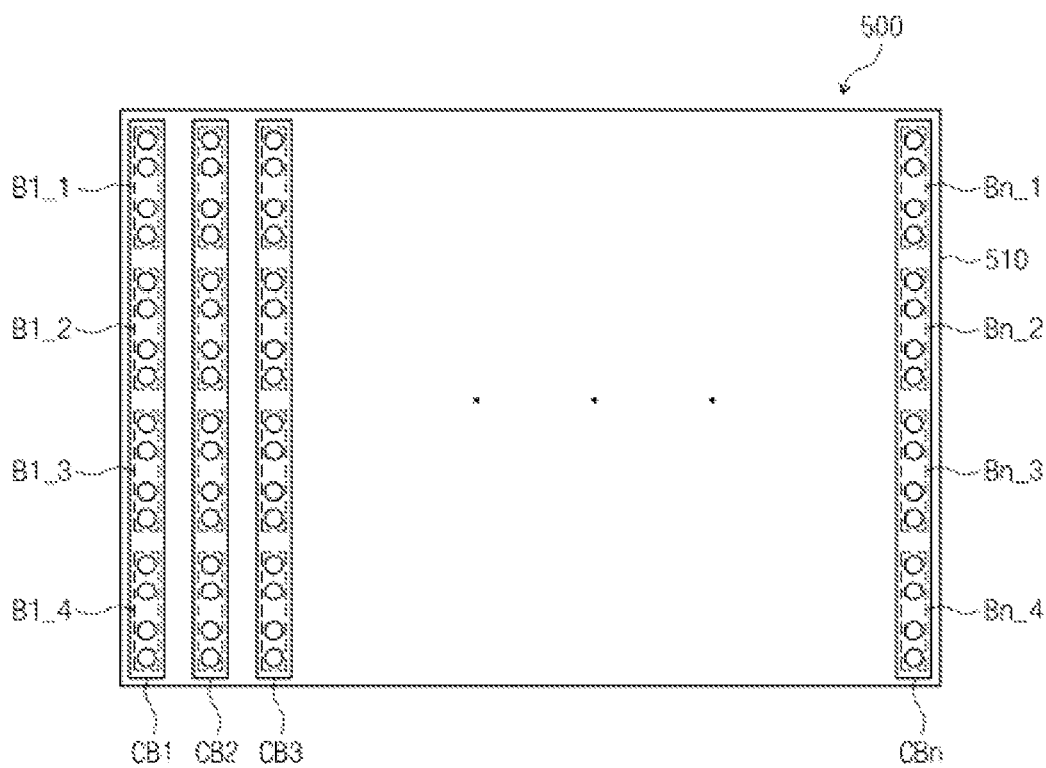
FIG. 3 is a plan view showing a backlight unit shown in FIG. 1.
Figure 4:
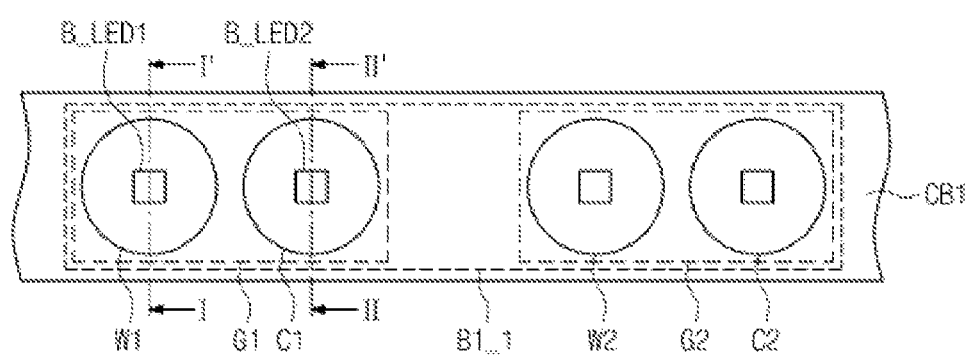
FIG. 4 is an enlarged plan view showing a first light source block shown in FIG. 3.
Figure 5:
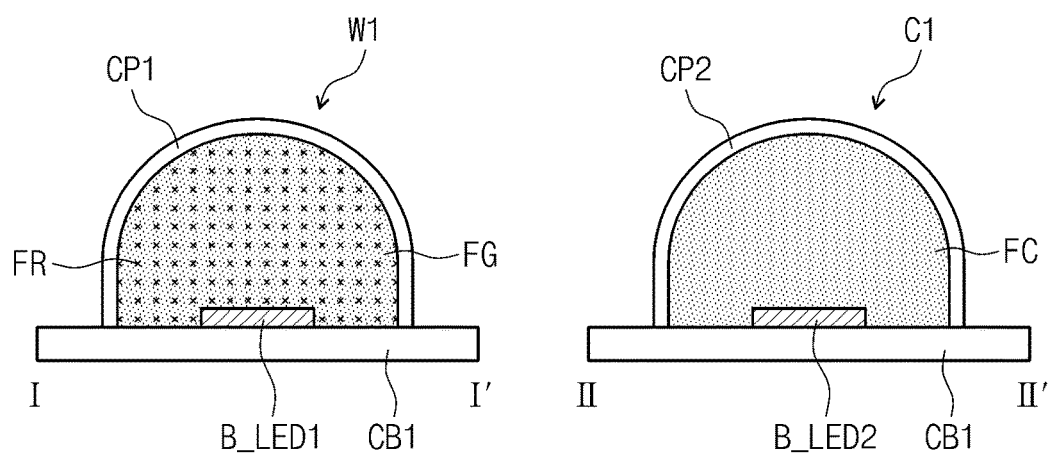
FIG. 5 is a cross-sectional view taken along lines I-I' and II-II' of FIG. 4.

FIG. 3 is a plan view showing the backlight unit 500 shown in FIG. 1, FIG. 4 is an enlarged plan view showing a first light source block shown in FIG. 3, and FIG. 5 is a cross-sectional view taken along lines I-I' and II-II' of FIG. 4.

Referring to FIGS. 3 and 4, the backlight unit 500 includes a base substrate 510, first to n-th circuit bars CB1 to CBn arranged in one direction on the base substrate 510, and a plurality of first light sources W1 to W2n mounted on the first to n-th circuit bars CB1 to CBn, and a plurality of second light sources C1 to C2n mounted on the first to n-th circuit bars CB1 to CBn. The first light sources W1 to W2n and the second light sources C1 to C2n are separately disposed on the first to n-th light source blocks B1_1 to Bn_4.

In detail, each of the first n-th light source blocks B1_1 to Bn_4 includes two light source groups each including one first light source and one second light source. The number of the light source groups included in each light source block should not be limited to two, but each light source group is required to include at least one first light source and at least one second light source.

Hereinafter, the first light sources W1 to W2n will be described as a white light source emitting a white light as the first light and the second light sources C1 to C2n will be described as a cyan light source emitting a cyan light as the second light.

As shown in FIG. 4, the first light source block B1_1 includes first and second light source groups G1 and G2 and the first light source group G1 includes a first white light source W1 and a first cyan light source C1. The second light source group G2 includes a second white light source W2 and a second cyan light source C2. In the illustrated exemplary embodiment, since the first and second light source groups G1 and G2 have the same structure and function, hereinafter the first light source group G1 will be described in detail and details of the second light source group G2 will be omitted.

Referring to FIG. 5, the first white light source W1 of the first light source group G1 includes a first light emitting diode ("LED") chip B_LED1, a first cover part CP1, a first fluorescent substance FR, and a second fluorescent substance FG.

The first LED chip B_LED1 is disposed (e.g., mounted) on the first circuit bar CB1 and may be, but not limited to, a blue LED chip emitting a blue light. Hereinafter, the first LED chip B_LED1 is referred to as a first blue LED chip. In an exemplary embodiment, the first cover part CP1 has a hemi-spherical lens shape, for example, to secure a wide beam spread angle and covers the first blue LED chip B_LED1. In an exemplary embodiment, the first cover part CP1 includes a silicon resin or an epoxy resin, for example. The first and second fluorescent substances FR and FG are mixed in the cover part CP1. In an exemplary embodiment, the first fluorescent substance FR is a red fluorescent substance excited by the blue light to emit a red light, and the second fluorescent substance FG is a green fluorescent substance excited by the blue light to emit a green light, for example.

In the illustrated exemplary embodiment, the blue light has a peak wavelength in a wavelength range from about 430 nanometers (nm) to about 460 nm, for example. In an exemplary embodiment, the green light excited by the blue light has a peak wavelength in a wavelength range from about 530 nm to about 550 nm, and the red light excited by the blue light has a peak wavelength in a wavelength range from about 630 nm to about 660 nm, for example. Therefore, the first light that is the white light obtained by mixing the red light, which is excited together with the blue light, and the green light with each other may have three peak wavelengths.

The first cyan light source C1 includes a second LED chip B_LED2, a second cover part CP2, and a third fluorescent substance FC. In an exemplary embodiment, the second LED chip B_LED2 is mounted on the first circuit bar CB1 and may be, but not limited to, the blue LED chip emitting the blue light. In an exemplary embodiment, the second cover part CP2 has a hemi-spherical lens shape, for example, and covers the second blue LED chip B_LED2. The third fluorescent substances FC is disposed inside of the second cover part CP2. In an exemplary embodiment, the third fluorescent substance FC is a cyan fluorescent substance excited by the blue light to emit a cyan light, for example.

In the illustrated exemplary embodiment, the blue light has the peak wavelength in the wavelength range from about 430 nm to about 460 nm, for example. In an exemplary embodiment, the cyan light excited by the blue light has a peak wavelength in a wavelength range from about 490 nm to about 510 nm, for example. Thus, the second light obtained by mixing the blue light and the cyan light has two peak wavelengths.

Figure 6A:
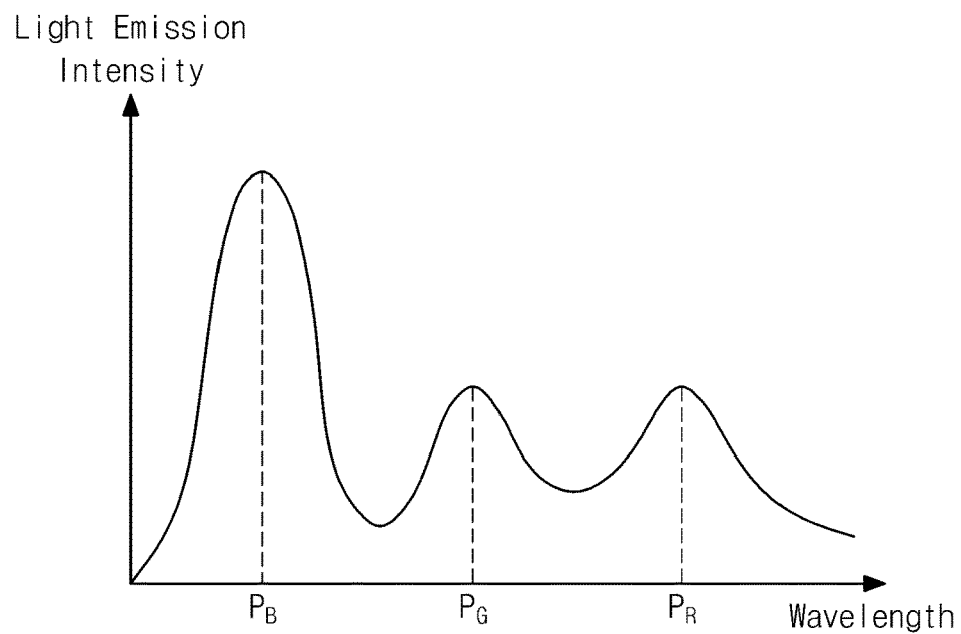
FIG. 6A is a waveform diagram showing a spectrum of a first light emitted from a first white light source.
Figure 6B:
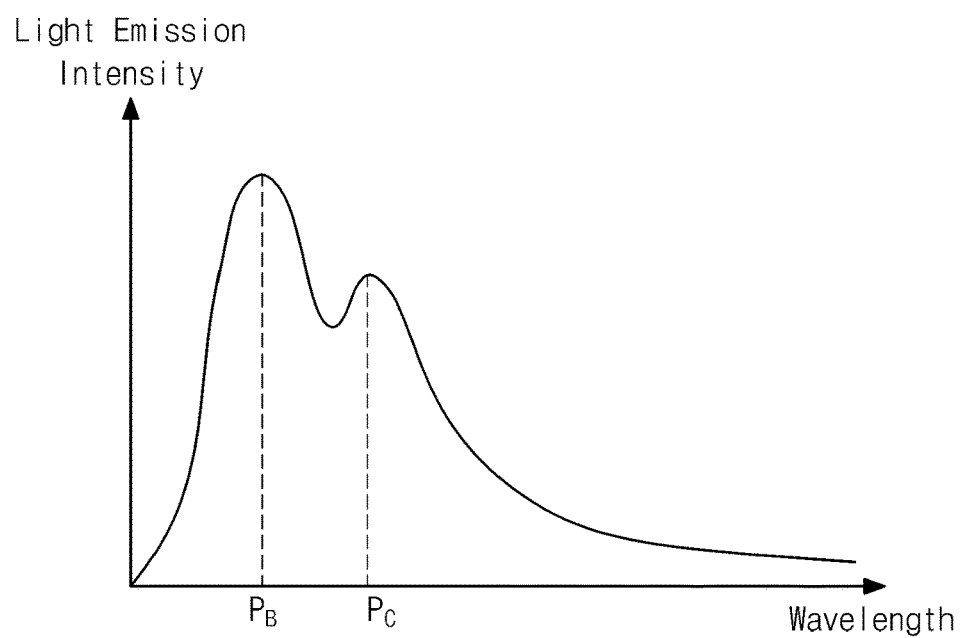
FIG. 6B is a waveform diagram showing a spectrum of a second light emitted from a first cyan light source.

FIG. 6A is a waveform diagram showing a spectrum of the first light emitted from the first white light source W1 and FIG. 6B is a waveform diagram showing a spectrum of the second light emitted from the first cyan light source C1.

Referring to FIG. 6A, when the first white light source W1 includes the first blue LED chip B_LED1 and the red and green fluorescent substances FR and FG, the first light has three peak wavelengths respectively positioned in red, green, and blue wavelength areas.

Hereinafter, the light emission peak wavelength positioned in the blue wavelength area, the light emission peak wavelength positioned in the green wavelength area, and the light emission peak wavelength positioned in the red wavelength area are respectively referred to as a first peak wavelength $P_B$, a second peak wavelength $P_G$, and a third peak wavelength $P_R$. Light emission intensity of the first light emitted from the first white light source W1 is not constant over the whole wavelength area. In particular, an area in which the light emission intensity of the first light is particularly low exists between the first and second peak wavelengths $P_B$ and $P_G$ and between the second and third peak wavelengths $P_G$ and $P_R$.

The second light has the peak wavelength in the area in which the light emission intensity of the first light is particularly low, e.g., in a cyan wavelength area. When the first cyan light source C1 includes a second blue LED chip B_LED2, the second light may further have a fourth peak wavelength $P_B$ positioned in the blue wavelength area in addition to a third peak wavelength $P_C$ positioned in the cyan wavelength area. In an exemplary embodiment, the third peak wavelength PC is positioned in the wavelength range from about 490 nm to about 510 nm, for example.

Figure 7:
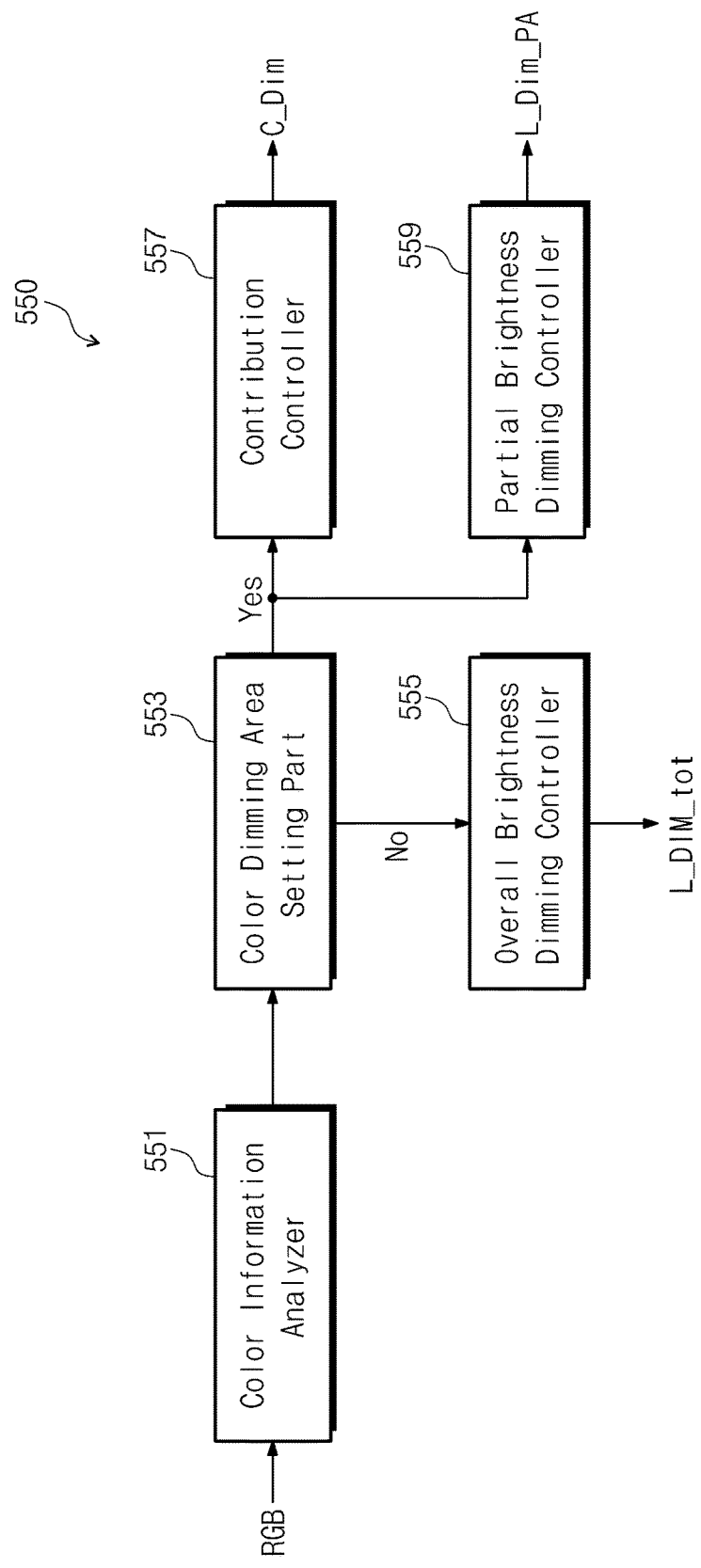
FIG. 7 is an inner block diagram showing a light source driving part shown in FIG. 1.

FIG. 7 is an inner block diagram showing the light source driver 550 shown in FIG. 1.

Referring to FIG. 7, the light source driver 550 controls turn on and off of the first and second light sources when each light source block B1_1 to Bn_4 provides the first and second lights to the corresponding dimming areas. The light source driver 550 controls brightness when the first and second light sources are turned on to control the brightness and contribution of the first and second lights provided to the corresponding dimming area.

The light source driver 550 includes a color information analyzer 551, a color dimming area setting part 553, an overall brightness controller 555, a contribution controller 557, and a partial brightness dimming controller 559.

The color information analyzer 551 receives the input image data RGB from the timing controller 100 and analyzes color information of predetermined dimming areas D1_1 to Dn_4 on the basis of the input image data RGB. The color dimming area setting part 553 receives the analyzed result from the color information analyzer 551 and sets a color dimming area on which a color dimming is performed among the dimming areas D1_1 to Dn_4 in accordance with the analyzed result. According to the illustrated exemplary embodiment, the display apparatus 600 may perform the color dimming only on the cyan color. Accordingly, the color dimming area setting part 553 detects the area on which the cyan color is displayed in accordance with the analyzed result and sets the dimming areas corresponding to the detected area to the color dimming area.

That is, the color dimming area setting area 553 checks that the cyan color area exists in the image, and controls the backlight unit 500 such that the color dimming and the brightness dimming are performed together with each other when the cyan color area exists. When the cyan color area does not exist, the backlight unit 500 is controlled to perform only the brightness dimming and not to perform the color dimming.

When the cyan color area does not exist, the overall brightness dimming controller 555 is operated to perform an overall brightness dimming L_Dim_tot. The overall brightness dimming L_Dim_tot controls brightness of the light source blocks respectively corresponding to the dimming areas D1_1 to Dn_4 using the first light sources W1 to W2n. In this case, the brightness dimming is performed on the overall of the dimming areas D1_1 to Dn_4.

When the cyan color area exists in the image, the color dimming and the brightness dimming are substantially and simultaneously performed on the dimming areas corresponding to the cyan color area, and a partial brightness dimming L_Dim_PA is performed on the dimming area not corresponding to the cyan color area.

The partial brightness dimming controller 559 controls brightness of the light source blocks respectively corresponding to the dimming areas, which are not the cyan color area, to perform the partial brightness dimming L_Dim_PA. The contribution controller 557 performs the color dimming C_Dim using the second light source C1 to C2n, i.e., the cyan light source, of the light source block corresponding to the dimming area at which the cyan color area is positioned. The color dimming C_Dim may be the cyan dimming. When the color dimming C_Dim is performed, the second light source is turned on to correspond to the color dimming area, so that the contribution of the cyan light increases. In this case, the brightness of the second light source is controlled in the color dimming area to decrease contribution of the white light. The color dimming C_Dim may be performed by controlling the contribution of the first light sources W1 to W2n and the second light sources C1 to C2n with respect to a target brightness of the color dimming area. Accordingly, a difference in brightness between the color dimming area and the brightness dimming area is not perceived by human eye.

Figure 8:
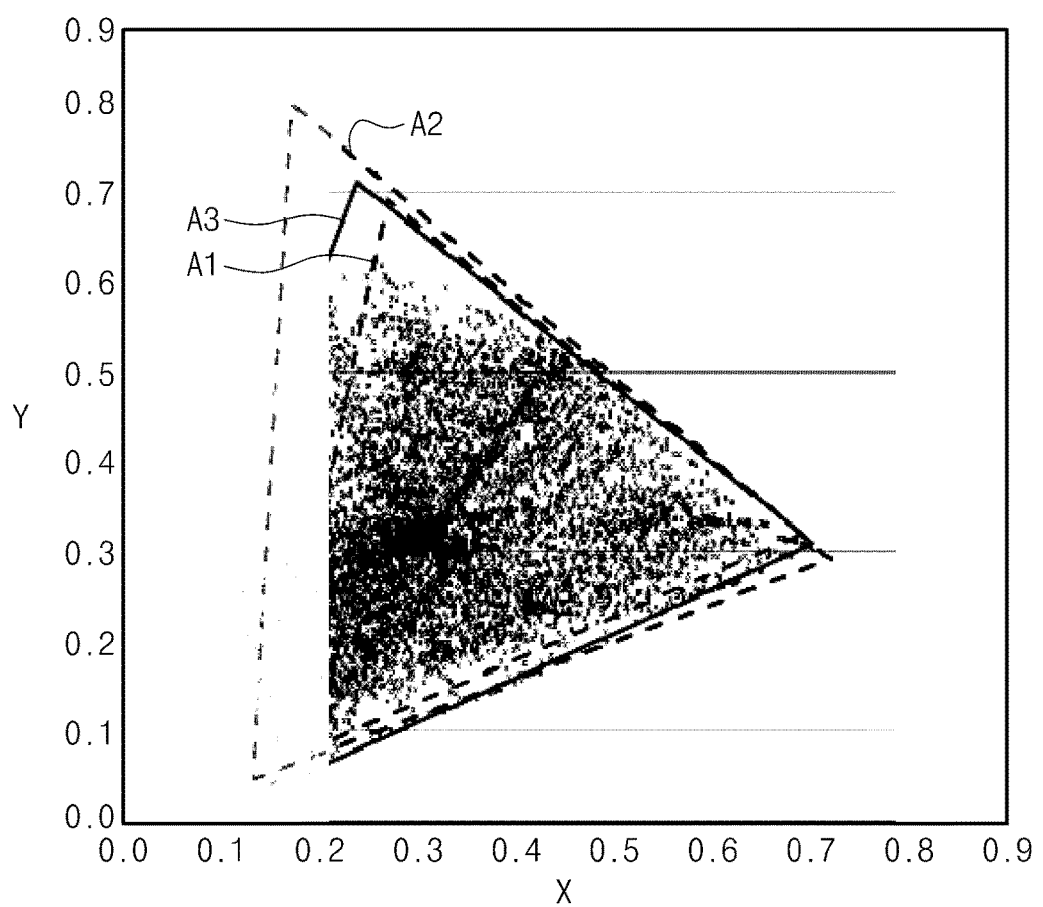
FIG. 8 is a view showing an exemplary embodiment of a color reproduction range according to the invention.

FIG. 8 is a view showing a color reproduction range according to an exemplary embodiment of the invention. In FIG. 8, a first graph A1 shows a color reproduction range according to a digital cinema color ("DIC") standard, a second graph A2 shows a color reproduction range according to an UHD color standard, and a third graph A3 shows the color reproduction range according to the invention. Dots shown in FIG. 8 show a range of an object color determined by spectrum characteristics of the object against reflection or transmission.

As shown in FIG. 8, the UHD color standard has the color reproduction range expanded more than the DIC standard, and particularly, the cyan wavelength area of the UHD color standard is extremely expanded more than the DIC standard when compared to magenta and yellow wavelength areas.

When the backlight unit 500 employs the cyan light source and performs the cyan color dimming, a color gamut of the cyan wavelength area in the UHD color standard may be expanded more than that of the DIC standard.

FIGS. 3 to 8 shows the expansion of the color reproduction range of the cyan wavelength area, but similarly, the color reproduction range of the magenta and yellow wavelength areas may be expanded.

As shown in FIG. 5, the same blue LED chip may be used as each of the first white light source W1 and the first cyan light source C1. A variation in color characteristic of the blue LED chip according to a time lapse is smaller than that of red and green LED chips and a manufacturing cost of the blue LED chip is lower than that of the red and green LED chips. In addition, when the first white light source W1 and the first cyan light source C1 employ the same blue LED, a difference in color characteristics between the two light sources may be prevented from increasing due to the time lapse. Consequently, the display apparatus 600 may expand the color reproduction range and perform the color dimming without increasing the manufacturing cost and prevent the difference in color characteristics between the two light sources from increasing due to the time lapse.

Figure 9:
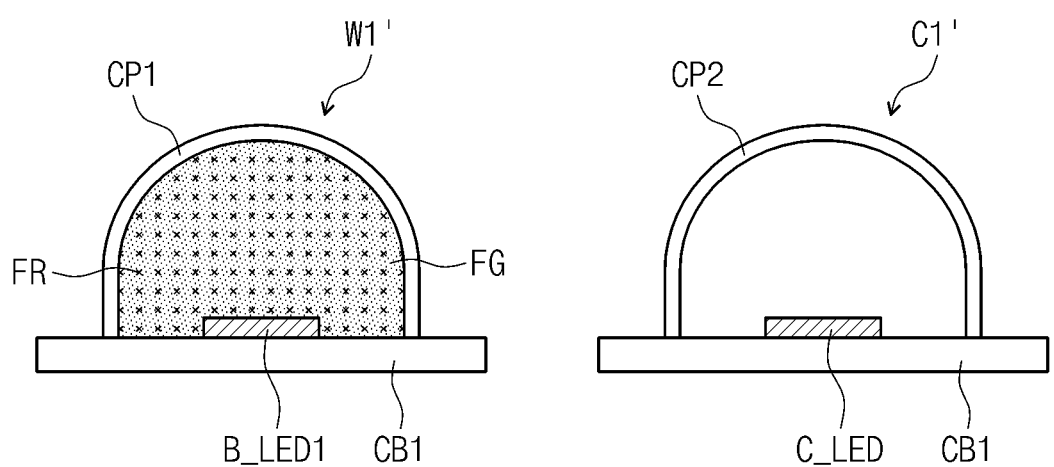
FIG. 9 is a cross-sectional view showing another exemplary embodiment of a white light source and a cyan light source according to the invention.

FIG. 9 is a cross-sectional view showing a white light source W1' and a cyan light source C1' according to another exemplary embodiment of the invention. The white light source W1' shown in FIG. 9 has the same structure and function as those of the first white light source W1 shown in FIG. 5, details of the first white light source W1' will be omitted. In FIG. 9, the same reference numerals denote the same elements in FIG. 5, and thus detailed descriptions of the same elements will be omitted.

Referring to FIG. 9, the cyan light source C1' includes a cyan LED chip C_LED and a second cover part CP2 covering the cyan LED chip C_LED. In an exemplary embodiment, the cyan LED chip C_LED emits a cyan light having a peak wavelength in a wavelength range from about 490 nm to about 510 nm, for example. The second cover part CP2 covers the cyan LED chip C_LED and expands a wide beam spread angle of the cyan light. A fluorescent substance does not exist in an inner space defined by the second cover part CP2. Therefore, the cyan light emitted from the cyan LED chip C_LED may be used as the second light. In this case, the second light has one peak wavelength.

Figure 10A:
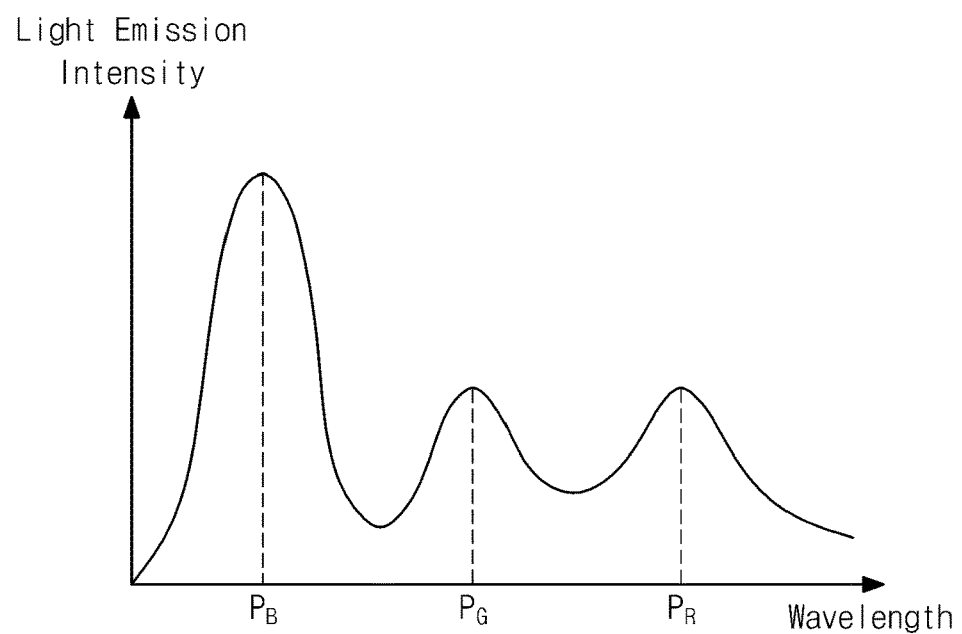
FIG. 10A is a waveform diagram showing a spectrum of a first light emitted from the white light source shown in FIG. 9.
Figure 10B:
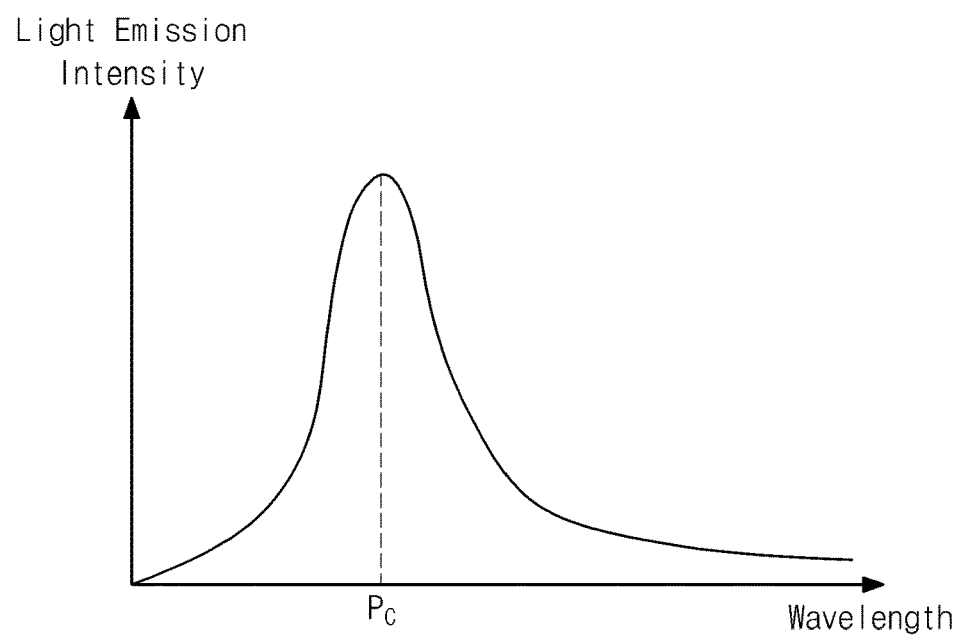
FIG. 10B is a waveform diagram showing a spectrum of a second light emitted from the cyan light source shown in FIG. 9.

FIG. 10A is a waveform diagram showing a spectrum of the first light emitted from the white light source W1' shown in FIG. 9 and FIG. 10B is a waveform diagram showing a spectrum of the second light emitted from the cyan light source C1' shown in FIG. 9.

Referring to FIG. 10A, when the white light source W1' includes the first blue LED chip B_LED1 and the red and green fluorescent substances FR and FG, the first light has three peak wavelengths respectively positioned in red, green, and blue wavelength areas.

Hereinafter, the light emission peak wavelength positioned in the blue wavelength area, the light emission peak wavelength positioned in the green wavelength area, and the light emission peak wavelength positioned in the red wavelength area are respectively referred to as a first peak wavelength $P_B$, a second peak wavelength $P_G$, and a third peak wavelength $P_R$. Light emission intensity of the first light emitted from the white light source W1' is not constant over the whole wavelength area. In particular, an area in which the light emission intensity of the first light is particularly low exists between the first and second peak wavelengths $P_B$ and $P_G$ and between the second and third peak wavelengths $P_G$ and $P_R$.

The second light has the peak wavelength in the area in which the light emission intensity of the first light is particularly low, e.g., in the cyan wavelength area. When the cyan light source C1' includes a cyan LED chip C_LED, the second light may have only the third peak wavelength $P_C$ positioned in the cyan wavelength area. In an exemplary embodiment, the third peak wavelength PC is positioned in the wavelength range from about 490 nm to about 510 nm, for example.

Figure 11:
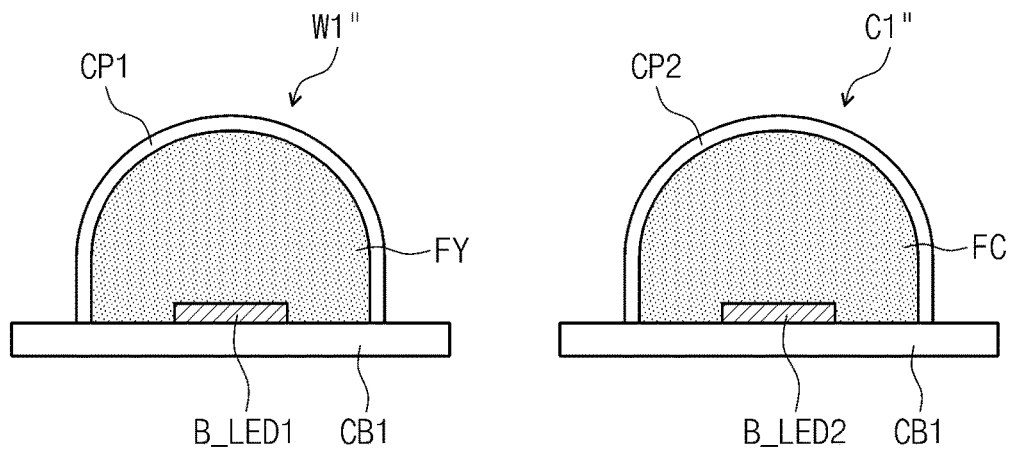
FIG. 11 is a cross-sectional view showing another exemplary embodiment of a white light source and a cyan light source according to the invention.

FIG. 11 is a cross-sectional view showing a white light source W1" and a cyan light source C1" according to another exemplary embodiment of the invention. The cyan light source C1" shown in FIG. 11 has the same structure and function as those of the first cyan light source C1 shown in FIG. 5, details of the cyan light source C1" will be omitted. In FIG. 11, the same reference numerals denote the same elements in FIG. 5, and thus detailed descriptions of the same elements will be omitted.

Referring to FIG. 11, the white light source W1" includes a first blue LED chip B_LED1, a first cover part CP1 covering the first blue LED chip B_LED1, and a fourth fluorescent substance FY. The first blue LED chip B_LED1 emits a blue light. The first cover part CP1 covers the first blue LED chip B_LED1. The fourth fluorescent substance FY is disposed in an inner space defined by the first cover part CP1. The fourth fluorescent substance FY includes a yellow fluorescent substance. Accordingly, the blue light is excited by the fourth fluorescent substance FY and a yellow light is generated. The white light source W1" emits a white light by mixing the blue light and the yellow light.

In this case, the first light emitted from the white light source W1" has two peak wavelengths. A first peak wavelength of the two peak wavelengths is positioned in a blue wavelength area and a second peak wavelength of the two peak wavelengths is positioned in a yellow wavelength area.

Figure 12:
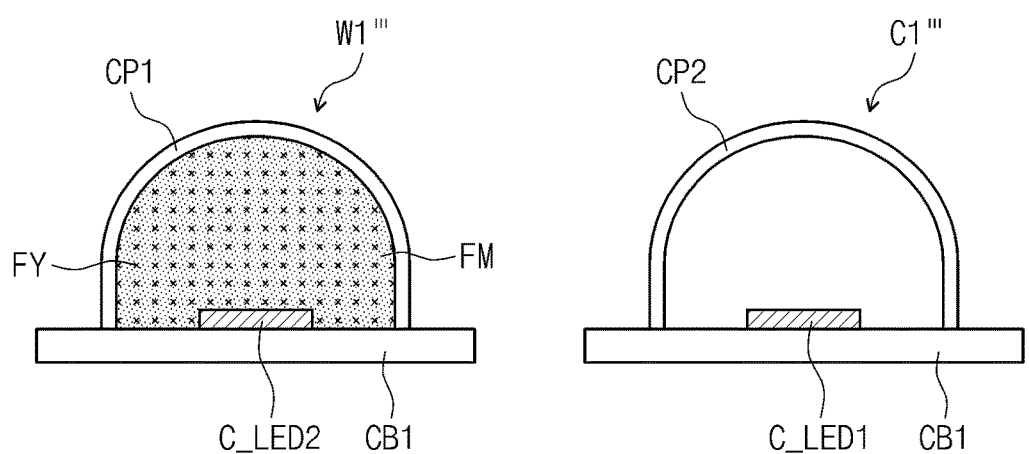
FIG. 12 is a cross-sectional view showing exemplary embodiment of a white light source and a cyan light source according to another the invention.

FIG. 12 is a cross-sectional view showing a white light source W1'" and a cyan light source C1'" according to another exemplary embodiment of the invention. The cyan light source C1'" shown in FIG. 12 has the same structure and function as those of the cyan light source C1' shown in FIG. 9, details of the cyan light source C1'" will be omitted. In FIG. 12, the same reference numerals denote the same elements in FIG. 5, and thus detailed descriptions of the same elements will be omitted.

Referring to FIG. 12, the white light source W1'" includes a cyan LED chip C_LED2, a first cover part CP1 covering the cyan LED chip C_LED2, and fifth and sixth fluorescent substances FM and FY. The cyan LED chip C_LED2 emits a cyan light. The first cover part CP1 covers the cyan LED chip C_LED2. The fifth and sixth fluorescent substances FM and FY are disposed in an inner space defined by the first cover part CP1. The fifth fluorescent substance FM includes a magenta fluorescent substance excited by the blue light to emit a magenta light and the sixth fluorescent substance FY includes a yellow fluorescent substance excited by the blue light to emit a yellow light.

Accordingly, the white light source W1''' emits a white light by mixing the magenta light, which is excited together with the cyan light, and the yellow light.

In this case, the first light emitted from the white light source W1''' has three peak wavelengths. A first peak wavelength of the three peak wavelengths is positioned in a cyan wavelength area, a second peak wavelength of the three peak wavelengths is positioned in a magenta wavelength area, and a third peak wavelength of the three peak wavelengths is positioned in a yellow wavelength area.

Figure 13:
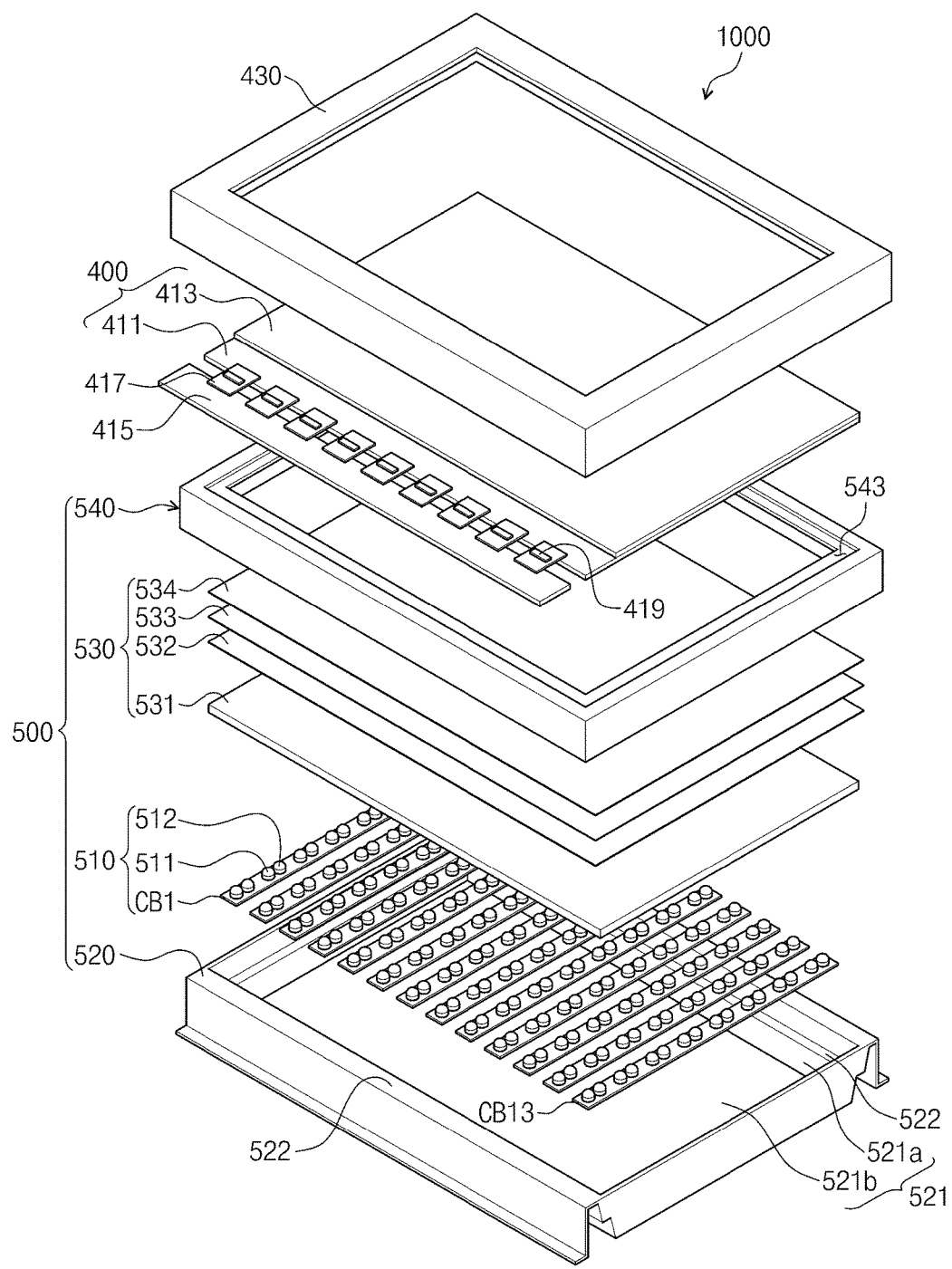
FIG. 13 is an exploded perspective view showing an exemplary embodiment of a liquid crystal display device according to the invention.

FIG. 13 is an exploded perspective view showing an LCD device 1000 according to an exemplary embodiment of the invention.

Referring to FIG. 13, the LCD device 1000 includes the backlight unit 500 generating a plane light and a display panel 400 receiving the plane light to display an image.

The display panel 400 includes an array substrate 411, an opposite substrate 413 coupled to the array substrate 411 and facing the array substrate 411, and a liquid crystal layer (not shown) interposed between the array substrate 411 and the opposite substrate 413.

In an exemplary embodiment, the array substrate 411 includes thin film transistors (hereinafter, referred to as TFTs) disposed thereon. Each of the TFTs is connected to a corresponding data line of the data lines DL1 to DLm (refer to FIG. 1) and a corresponding gate line of the gate lines GL1 to GLn (refer to FIG. 1) through source and gate terminals thereof, and a drain terminal of each TFT is connected to the pixel electrode including a transparent conductive material.

The opposite substrate 413 includes a color filter layer used to realize colors, a black matrix, and a common electrode including a transparent conductive material. At least one of the color filter layer, the black matrix, and the common electrode may be disposed on the array substrate 411. In an exemplary embodiment, the color filter layer includes red, green, and blue color pixels and may further include color pixels having other colors rather than the red, green, and blue colors, for example.

The LCD device 1000 includes a printed circuit board ("PCB") 415 including the timing controller 100 (refer to FIG. 1) applying the data control signal D-CS (refer to FIG. 1) and the gate control signal G-CS (refer to FIG. 1) to the display panel 400 and a driving circuit film 417 connecting the PCB 415 to the display panel 400.

In an exemplary embodiment, the driving circuit film 417 is realized by a tape carrier package TCP on which a driving chip 419 is mounted or a chip-on-film ("COF").

The driving chip 419 includes the data driver 300 (refer to FIG. 1) applying the data signals to the data lines DL1 to DLm of the display panel 400 in response to the data control signal D-CS. In addition, the gate driver 200 (refer to FIG. 1) applying the gate signals to the gate lines GL1 to GLn of the display panel 400 in response to the gate control signal G-CS may be built in the display panel 400 through a thin film process.

The backlight unit 500 includes a light source part 510, an accommodating member 520, an optical member 530, and a frame member 540.

The accommodating member 520 includes an accommodating part 521 accommodating the light source part 510 and a support part 522 supporting the optical member 530. In an exemplary embodiment, the accommodating part 521 includes a bottom surface 521b and a sidewall 521a extending from the bottom surface 521b, and the bottom surface 521b has substantially a rectangular shape, for example. The sidewall 521a extends from an edge of the bottom surface 521b to define an accommodating space in which the light source part 510 is accommodated. In an exemplary embodiment, the accommodating member 520 includes an aluminum-based metal that effectively discharges heat generated from the light source part 510 and has superior strength and small deformation, for example.

The optical member 530 receives the light from the light source part 510, converts the light to the plane light, and includes a diffusion plate 531 and optical sheets 532, 533, and 534. In an exemplary embodiment, the diffusion plate 531 has substantially a plate shape, for example, and thus the diffusion plate 531 is disposed on the light source part 510 and diffuses the light from the light source part 510 to improve brightness uniformity of the light. In addition, the diffusion plate 531 supports the optical sheets 532, 533, and 534 from sagging down.

The optical sheets 532, 533, and 534 are disposed on the diffusion plate 531 and include at least one sheet to improve brightness characteristics of the light exiting from the diffusion plate 531. In an exemplary embodiment, the optical sheets 532, 533, and 534 include one diffusion sheet 532 to diffuse the light and two prism sheets 533 and 534 to condense the light, for example.

The diffusion sheet 532 is disposed on the diffusion plate 531 and diffuses the light exiting from the diffusion plate 531. In an exemplary embodiment, the diffusion sheet 532 includes a transparent material, e.g., polyethylene terephthalate ("PET").

The prism sheets 533 and 534 are disposed on the diffusion sheet 532 and condense the diffused light by the diffusion sheet 532 to improve a front brightness. Each of the prism sheets 533 and 534 includes a prism pattern (not shown) having a prism shape. In an exemplary embodiment, one of the prism sheets 533 and 534 includes the prism pattern extending in a first direction and the other of the prism sheets 533 and 534 includes the prism pattern extending in a second direction substantially perpendicular to the first direction.

The backlight unit 500 includes the frame member 540 disposed between the optical member 530 and the display panel 400. The frame member 540 is coupled to the accommodating member 520 to fix the optical member 530 to the accommodating member 520, thereby preventing the diffusion plate 531 from moving.

The frame member 540 supports the display panel 400. In detail, the frame member 540 further includes a panel guide part 543 on which the display panel 400 is placed, and the panel guide part 543 guides the display panel 400.

The LCD device 1000 further includes a top chassis 430 coupled to the frame member 540 to fix the display panel 400 to the frame member 540. The top chassis 430 surrounds an edge of the display panel 540 and fixes the display panel 400 to the panel guide part 543 of the frame member 540. Therefore, the top chassis 430 prevents the display panel 400 from being damaged from external impacts and from being separated from the panel guide part 543 of the frame member 540.

The light source part 510 includes first to thirteen circuit bars CB1 to CB13 and first and second light sources 511 and 512 mounted on each of the first to thirteen circuit bars CB1 to CB13. The first to thirteen circuit bars CB1 to CB13 extend in one direction and are arranged in a direction substantially perpendicular to the one direction. The first and second light sources 511 and 512 are arranged on each of the first to thirteen circuit bars CB1 to CB13 as one light source group. In an exemplary embodiment, the first light source 511 may be the white light source emitting the white light and the second light source 512 may be the cyan light source emitting the cyan light, for example. The first to thirteen circuit bars CB1 to CB13 are accommodated in the accommodating part 521 to face the optical member 530.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
    a backlight unit comprising:
        a first light source which emits a first light having at least two peak wavelengths and comprises a first light emitting diode chip which emits a first color light; and
        a second light source which emits a second light having a peak wavelength different from the at least two peak wavelengths and comprises a second light emitting diode chip which emits a second color light;
    a display panel which receives the first light and the second light to display an image corresponding to an input image data and includes a plurality of dimming areas; and
    a light source driver which analyzes a color information of the plurality of dimming areas on the basis of the input image data, and controls a contribution of the first and second light sources with respect to a target brightness of each of the plurality of dimming areas in accordance of the color information,
    wherein, when a color dimming area of the plurality of dimming areas corresponding to a color light of the second light does not exist, an overall brightness dimming is performed for all of the plurality of dimming areas, and when the color dimming area corresponding to the color light of the second light exists, a color dimming and a brightness dimming are performed substantially and simultaneously only on the color dimming area of the plurality of dimming areas corresponding to the color light of the second light, and
    wherein the color dimming area is set by detecting an area on which the color light of the second light is displayed in the image in accordance with the analyzed result of the input image data, and the second color light is a cyan light.

2. The display apparatus of claim 1, wherein the first light source further comprises:
    a first color fluorescent substance which is disposed on the first light emitting diode chip, excited by the first color light and emits a third color light; and
    a second color fluorescent substance which is disposed on the first light emitting diode chip, excited by the first color light and emits a fourth color light.

3. The display apparatus of claim 2, wherein the first color light is a blue light, the third color light is a red light, and the fourth color light is a green light.

4. The display apparatus of claim 1, wherein the first color light is a blue light.

5. The display apparatus of claim 1, wherein
    the plurality of dimming areas are defined in the display panel in a matrix form,
    the backlight unit further comprises a plurality of light source blocks respectively corresponding to the plurality of dimming areas, and
    at least one light source group including the first and second light sources are disposed in each of the plurality of light source blocks.

6. The display apparatus of claim 5, wherein the first light source is a white light source which emits a white light.

7. A display apparatus comprising:
    a backlight unit comprising a first light source which comprises a first light emitting diode chip and emits a white light and a second light source which comprises a second light emitting diode chip which emits a first color light;
    a display panel which receives the white light and the first color light, displays an image corresponding to an input image data and includes a plurality of dimming areas; and
    a light source driver which analyzes a color information of the plurality of dimming areas on the basis of the input image data and controls a contribution of the first and second light sources with respect to a target brightness of each of the plurality of dimming areas in accordance of the color information,
    wherein, when a color dimming area of the plurality of dimming areas corresponding to a color light of the first color light does not exist, an overall brightness dimming is performed for all of the plurality of dimming areas, and when the color dimming area corresponding to the color light of the first color light exists, a color dimming and a brightness dimming are performed substantially and simultaneously only on the color dimming area of the plurality of dimming areas corresponding to the color light of the first color light, and
    wherein the color dimming area is set by detecting an area on which the color light of the first color light is displayed in the image in accordance with the analyzed result of the input image data, and the first color light is a cyan light.

8. The display apparatus of claim 7, wherein the first light source further comprises:
    a first color fluorescent substance disposed on the first light emitting diode chip and excited by a second color light to emit a third color light; and
    a second color fluorescent substance which is disposed on the first light emitting diode chip, excited by the second color light and emits a fourth color light.

9. The display apparatus of claim 8, wherein the second color light is a blue light, the third color light is a red light, and the fourth color light is a green light.

10. The display apparatus of claim 8, wherein the second color light is a blue light, and the third color light is a yellow light and the fourth color light is a magenta color light.

11. A method of driving a display apparatus, the method comprising:
    analyzing a color information of a plurality of dimming areas on the basis of an input image data;
    extracting a color dimming area of the plurality of dimming areas to be color-dimmed in accordance with the analyzed result;
    setting a target brightness of each of the plurality of dimming areas when the color dimming area does not exist in accordance with the extracting result to perform a brightness dimming on the dimming areas;
    controlling a contribution of a first light source which comprises a first light emitting diode chip and emits a white light and a second light source which comprises a second light emitting diode chip which emits a color light when the color dimming area exists in accordance with the extracting result to perform a color dimming on the color dimming area; and setting a target brightness of remaining dimming areas of the plurality of dimming areas except for the color dimming area when the color dimming area exists in accordance with the extracting result to perform the brightness dimming on the remaining dimming areas, wherein, when the color dimming area corresponding the color light does not exist, an overall brightness dimming is performed for all of the plurality of dimming areas, and when the color dimming area corresponding to the color light exists, a color dimming and a brightness dimming are performed substantially and simultaneously only on the color dimming area of the plurality of dimming areas corresponding to the color light of the color light, wherein the color dimming area is set by detecting an area on which the color light of the color light is displayed in the image in accordance with the analyzed result of the input image data, and the color light is a cyan light.

12. The method of claim 11, wherein the white light has at least two peak wavelengths and the color light has a peak wavelength different from the at least two peak wavelengths.

* * * * *